(12) United States Patent
Linde et al.

(10) Patent No.: US 12,431,540 B2
(45) Date of Patent: Sep. 30, 2025

(54) INDICATOR APPARATUS AND METHOD FOR PRODUCING SAME

(71) Applicant: Airbus Operations GmbH, Hamburg (DE)

(72) Inventors: Peter Linde, Buxtehude (DE); Awista Nasiri, Glinde (DE)

(73) Assignee: Airbus Operations GmbH, Hamburg (DE)

( * ) Notice: Subject to any disclaimer, the term of this patent is extended or adjusted under 35 U.S.C. 154(b) by 280 days.

(21) Appl. No.: 17/534,737

(22) Filed: Nov. 24, 2021

(65) Prior Publication Data

US 2022/0085420 A1  Mar. 17, 2022

Related U.S. Application Data

(63) Continuation of application No. PCT/EP2020/065833, filed on Jun. 8, 2020.

(30) Foreign Application Priority Data

Aug. 23, 2019 (DE) ..................... 10 2019 212 677.4

(51) Int. Cl.
  *F21V 8/00* (2006.01)
  *B64D 41/00* (2006.01)
  (Continued)

(52) U.S. Cl.
  CPC ........ *H01M 10/0585* (2013.01); *B64D 41/00* (2013.01); *B64D 45/00* (2013.01);
  (Continued)

(58) Field of Classification Search
  CPC ........ G08B 7/062; G08B 17/10; G08B 7/066; G09F 13/20; G09F 19/22; G09F 13/00; G09F 2013/05; G09F 13/04
  See application file for complete search history.

(56) References Cited

U.S. PATENT DOCUMENTS 2,607,143 A * 8/1952 Wagner ................... G09F 13/06
  40/576
3,992,872 A * 11/1976 Stanish .............. G04B 45/0007
  40/433
(Continued)

FOREIGN PATENT DOCUMENTS

DE  10 2008 036 470 A1  2/2010
EP   3 026 734 A1  6/2016
WO  WO 2018/185659 A1  10/2018

OTHER PUBLICATIONS

International Preliminary Report on Patentability for Application No. PCT/EP2020/065833 dated Jun. 8, 2020.
(Continued)

*Primary Examiner* — Shin H Kim
(74) *Attorney, Agent, or Firm* — KDW Firm PLLC (57) ABSTRACT

An indicator apparatus for guiding interior aircraft occupants has a mounting device fastenable to a wall portion of the interior and having an indicator conveying an item of visual information to occupants. An indicator can be or is operated electrically, and the indicator can be or is connected to a power supply for operation. To create an indicator apparatus which helps improve orientation of cabin passengers, can be produced, installed and serviced easily, and which can be operated in a fail-safe manner in an emergency situation of the aircraft, the indicator has an at least one-piece layer, on which circuitry necessary for operation is provided in an integrated fashion, and the power supply is formed by a composite structure battery built up layer by layer and can be or is connected to the layer. A method for producing an indicator apparatus of this kind is disclosed.

19 Claims, 4 Drawing Sheets

(51) Int. Cl.
    *B64D 45/00*     (2006.01)
    *G08B 5/22*     (2006.01)
    *G08B 21/00*     (2006.01)
    *G09F 13/00*     (2006.01)
    *H01M 4/587*     (2010.01)
    *H01M 4/66*     (2006.01)
    *H01M 10/0525*     (2010.01)
    *H01M 10/0585*     (2010.01)
    *H01M 50/417*     (2021.01)
    *H01M 50/431*     (2021.01)

(52) U.S. Cl.
    CPC ............ *G09F 13/00* (2013.01); *H01M 4/587* (2013.01); *H01M 4/667* (2013.01); *H01M 10/0525* (2013.01); *H01M 50/417* (2021.01); *H01M 50/431* (2021.01); *B64D 2045/007* (2013.01); *H01M 2220/20* (2013.01)

(56) References Cited

U.S. PATENT DOCUMENTS

| | | | | |
|---|---|---|---|---|
| 4,029,994 | A * | 6/1977 | Iwans | B60Q 3/47 315/132 |
| 4,229,894 | A * | 10/1980 | Beck | G09F 13/06 40/579 |
| 4,801,928 | A * | 1/1989 | Minter | A62B 3/00 362/147 |
| 6,593,669 | B1 * | 7/2003 | Lemaire | H01M 10/48 429/7 |
| 7,265,684 | B2 * | 9/2007 | Stokes | H05B 47/195 340/945 |
| 7,342,513 | B2 * | 3/2008 | Meyer | H04B 7/18506 340/815.76 |
| 7,378,989 | B2 * | 5/2008 | Wisch | B64D 11/00 340/687 |
| 7,652,590 | B2 * | 1/2010 | Lin | G08B 5/36 340/815.45 |
| 8,376,567 | B1 * | 2/2013 | Zozula | G08B 7/066 362/217.1 |
| 10,306,713 | B2 * | 5/2019 | Zhang | H02J 7/0068 |
| 10,439,224 | B2 * | 10/2019 | Nagano | H01M 4/131 |
| 10,510,926 | B2 * | 12/2019 | Park | H01L 33/04 |
| 10,887,956 | B2 * | 1/2021 | Shan | H05B 45/3578 |
| 2005/0104740 | A1 | 5/2005 | Stokes et al. | |
| 2005/0202785 | A1 | 9/2005 | Meyer | |
| 2010/0076527 | A1 * | 3/2010 | Hammond | G09F 13/22 362/396 |
| 2013/0341188 | A1 * | 12/2013 | Sabate Vizcarra | H01M 8/1009 429/514 |
| 2015/0062927 | A1 * | 3/2015 | Hirakata | H01F 1/14791 362/362 |
| 2017/0018767 | A1 | 1/2017 | Park et al. | |
| 2017/0129607 | A1 | 5/2017 | Grant | |
| 2017/0280521 | A1 * | 9/2017 | Shan | B60Q 3/53 |
| 2019/0364634 | A1 * | 11/2019 | Shan | F21V 23/001 |
| 2021/0241661 | A1 * | 8/2021 | Shan | H05B 45/50 |
| 2022/0085420 | A1 * | 3/2022 | Linde | B64D 41/00 |

OTHER PUBLICATIONS

German Search Report for Application 102019212677.4 dated Jul. 31, 2020.

"GFDK Gesellschaft Fur Digitale Kaufberautaung MBH," Autobatterie Aufbau, http://www.batterie.org/autobatterie-aufbau/abgerufen dated Jul. 31, 2020.

International Search Report and Written Opinion for Application No. PCT/EP2020/065833 dated Sep. 1, 2020.

* cited by examiner

INDICATOR APPARATUS AND METHOD FOR PRODUCING SAME

CROSS-REFERENCE TO RELATED APPLICATIONS

This application is a continuation of and claims priority to PCT/EP2020/065833 filed Jun. 8, 2020 which claims priority to German Patent Application No. 10 2019 212 677.4 filed Aug. 23, 2019, the entire disclosures of which are incorporated by reference herein.

TECHNICAL FIELD

The disclosure herein relates to a display device for guiding occupants within an interior accommodated by an aircraft fuselage, having a carrier unit that is secured to a wall section of the interior and having at least one display that imparts at least one piece of visual information to the occupants of the interior when in operation, wherein the at least one display is electrically operable or operated, and wherein the at least one display is connectable or connected to a power supply for operation thereof. The disclosure herein also relates to a method of producing a display device in question, and to an aircraft equipped with such a display device.

BACKGROUND

Display devices of this kind are known, for example, as constituents of emergency exit guiding systems that help passengers or crew members of aircraft to get to evacuation stations, and are useful especially when the interior of the cabin, in an emergency, filled by the time the passengers try to escape from the cabin is filled with smoke.

Also known from aircraft cabins are overhead panels or overhead items on curtain rails; they are used, for example, in an aircraft cabin to accommodate a curtain rail while simultaneously creating a blocking and/or opaque separating unit between the upper edge of a dividing curtain running along the curtain rail and the cabin roof above. There is also the option of integrating illuminated information signs, for example exit signs or an occupied sign for toilets into the device. Such exit signs and toilet signs are currently illuminated with lamps, with establishment of the necessary connection to the data and power supply in the aircraft in question by regular cables. This entails a high level of complexity in manufacture and installation, which increases in the case of provision of customer-specific cabins in the aircraft. For example, in the case of an existing information panel, a three-figure number of components is installed, which take an assembly time of several hours.

Against this background, the problem addressed by the disclosure herein is that of providing a display device that helps to improve the orientation of passengers in the cabin of an aircraft, which is easy to produce, to assemble and to maintain, and which can be operated in a failsafe manner an aircraft emergency situation.

SUMMARY

This object is achieved in accordance with the disclosure herein by a display device, by a production method, and by an aircraft as disclosed herein.

What is accordingly provided is a display device of the type specified at the outset, in which the at least one display has been provided with an at least one-part layer on which the circuits needed for operation thereof are provided in integrated form, and in which the power supply is formed by at least one composite structure battery of layered structure which is connectable or connected to the layer.

By the disclosure herein, a display device, for instance in the form of an information panel, is illuminated using at least one composite structure battery, especially a laminated structural composite battery. The use of the battery/batteries in question itself/themselves allows the connected display device firstly to be operated in a quasi-autonomous manner; secondly, the integrated design of the display avoids the manual installation and assembly of cable looms, which reduces the overall complexity both with regard to the number of parts and time spent. The term "battery" in the context of this application is used primarily in the sense of a rechargeable secondary cell, where a non-rechargeable primary cell may also be meant in a corresponding manner.

Further advantageous embodiments are disclosed herein.

For instance, in order to replace a conventional cable loom in a suitable manner that permits simple handling, it is possible, in an advantageous embodiment of the display device of the disclosure herein, for the at least one-part layer to take the form of a flexible polymer film.

Appropriately, in one development of the display device of the disclosure herein, the at least one-part layer may be integrated with printed conductors and SMD (surface mounted design) components, for instance LEDs, resistors, logic chips or the like. More particularly, to both components a voltage controller may also be integrated in the at least one layer for driving of different illuminants. This leaves the outward appearance and the interface to the respective aircraft unchanged, which facilitates interchangeability. On account of the integrated circuit board pathways and LEDs, the display device of the disclosure herein is actually more flexible with regard to illumination with the composite battery structures used, and also more compatible in the sense of easier adaptation to different terminal structures than conventional cable looms.

In an advantageous embodiment of the display device of the disclosure herein, the at least one-part layer may be in multipart form, such that, for instance, conductor structures or components can be provided exactly where they are used, in which case the multiple parts of the layer may be both structurally and electrically connected to one another and may be in a distributed arrangement over the carrier unit. But it may also be advantageous, especially with regard to complexity of assembly, for the layer to have a one-part design.

In one design of the display device which is appropriate with regard to its handling, the at least one-part layer has been provided with an interface. By such an interface, for example in the form of a plug connector, the display device is especially connectable or connected to the respective to the power supply, and it is also possible here to establish a data connection, where the interface is subject essentially to no restrictions with regard to configuration apart from achievement of a minimum space requirement in some cases. It is also possible here to produce and/or match a connection to conventional and/or existing structures via the interface.

In an advantageous embodiment of the display device of the disclosure herein, the composite structure battery is designed with a laminated composite structure. The composites used here are considered to be multifunctionally usable by virtue of coupling of their high mechanical power with secondary physical functionality. On account of the ability to store energy, such materials, for instance, offer considerable weight savings at the system level. Laminated composite structures are produced here from layers of orthotropic materials (those having direction-dependent material properties). The advantages thereof over conventional materials are manifested, for instance, in relatively low intrinsic weight, high specific strength, excellent long-term strength, high stiffness/weight ratios, and flexibility in construction. It is possible here for every single lamella of a laminated structure composite of a battery (cell) to assume a separate function as electrode, current collector or separation layer (separator). A composite structure battery may be designed, for example, such that it has carbon fibers as anode, a glass fiber separation layer, a cathode comprising $LiFePO_4$, an electrolyte comprising polymerized vinyl ester derivatives of polyethylene glycol, and metallic current collectors.

In an advantageous development of the display device, the composite structure battery in layered form may be formed with one battery cell or a multitude of battery cells, each of which has laminated layers with anode, separation layer and cathode. In this way, a readily integratable battery of modular structure may be provided, the electrical power of which is controllable by the number of cells, and which can also be arranged in a distributed manner if required. It is possible here with preference to use carbon fibers as electrodes in the composite structure battery used in accordance with the disclosure herein, on account of their mechanical properties and easy intercalation of lithium ions.

In a further embodiment, the anode or anodes and the cathode or cathodes may take the form of poles of the respective battery cell, each with carbon fibers having appropriate structure or having a coating. Carbon fibers have high stiffness and strength, which offers mechanical reinforcement and favorable electrical conductivity properties for the transport of electrons into and out of the cell. For the anode, for instance, it is possible to use reinforced carbon fibers, while the cathode may consist of coated carbon fibers. The coating here may contain particles based on lithium-metal oxide, e.g. $LiFePO_4$. Carbon fibers themselves may not be used as part of the cathode since they act as anode and could thus short-circuit the battery.

In order to avoid a short circuit and to ensure that the positive and negative electrode do not come into contact with the respective other electrode, a separation layer (separator) is needed. The separator does not conduct electrons, but allows the transport of ions between the electrodes. In a further preferred embodiment of the display device, the separation layer may therefore be formed by a glass fiber laminate or a porous polyethylene.

But in order to be able to use carbon fibers in composite battery structures, a binder is required to bind the fibers and to form a composite battery. This may be formed by a solid-state electrolyte (SBE), preferably by a polymer, in order to assure a high modulus and a high level of ion transport properties. Moreover, such a composite structure battery, like conventional lithium ion batteries, is sensitive to moisture, and it therefore has to be protected from contact with moisture. Consequently, in a preferred execution of the display device of the disclosure herein, each pole for fiber connection of the carbon fibers has a solid-state electrolyte, preferably formed by a polymer.

In one development of the display device, the current collectors are each formed by a thermoplastic coated with a conductive material, since the batteries or their cells must be connected to an external circuit via current collectors. These are mounted close to the electrodes and conduct the energy from the electrodes to a consumer. In a lithium ion battery, the negative ions are collected at the anode and the positive ions at the cathode. During discharge, positive ions flow through the electrolyte to the anode, and from the anode through the current collectors through the external circuits to the cathode. In the course of charging, the electrons flow from the cathode back through the current collectors, through a charging unit (a device having higher potential) through the current collector to the anode. At the same time, the positive ions flow through the electrolyte to the cathode until the charged state has been attained.

In a preferred development, the thermoplastic may be a polycarbonate in the form of a film, especially provided with a silver layer in paste form by a printing method. The polycarbonate here may be an extruded polycarbonate film which is in flame-retardant form and hence meets any requisite fire protection classifications. Moreover, the polycarbonate in question can advantageously be printed without difficulties, for instance by the screenprinting or offset printing method. The relevant application of the deposited metal layer forms the conductive current collectors.

The stated object is likewise accordingly achieved by a method of producing a display device for guiding occupants within an interior accommodated by an aircraft fuselage, in which a carrier unit can be secured to a wall section of the interior and which comprises at least one display that imparts at least one piece of visual information to the occupants of the interior when in operation, wherein the at least one display is electrically operable or operated, and wherein the at least one display is connectable or connected to a power supply for operation thereof, wherein the at least one display has been provided with an at least one-part layer on which the circuits needed for operation thereof are provided in integrated form, and wherein the power supply is formed by at least one composite structure battery which is connectable or connected to the layer, wherein the method comprises the steps of:

providing at least one anode layer having carbon fibers, at least one cathode layer having coated carbon fibers and at least one separation layer comprising glass fibers or a porous polyethylene;

laminating the individual layers;

obtaining at least one multifunctional battery cell usable either as battery or as load carrier,     where reference may be made to the remarks above with regard to the features and the advantages thereof.

In advantageous variants, in the method of the disclosure herein, a multitude of battery cells may be combined and connected to form an overall composite structure battery, ends of a battery cell or battery may be provided with current collectors made of a coated thermoplastic, the battery cell or battery may be charged and the battery function may be tested and/or the optionally charged battery cell or battery may be integrated into or disposed on the carrier unit.

Finally, in the context of the disclosure herein, an aircraft provided with the display device of the disclosure herein also achieves the object stated at the outset.

The above configurations and developments can, where appropriate, be combined with one another as desired. Further possible configurations, developments and implementations of the disclosure herein also include combinations that have not been specified explicitly of features of the disclosure herein that have been described above or are described hereinafter with regard to the working examples. More particularly, the person skilled in the art will also add on individual aspects as improvements or supplementations to the respective basic form of the disclosure herein.

BRIEF DESCRIPTION OF THE DRAWINGS

The disclosure herein is elucidated in detail hereinafter with reference to the working examples specified in the schematic figures.

The appended figures are intended to impart further understanding of the embodiments of the disclosure herein. They illustrate embodiments of the disclosure herein and serve, in association with the description, to explain principles and concepts of the disclosure herein. Other embodiments and many of the advantages mentioned are apparent with regard to the drawings. The elements of the drawings are not necessarily shown true to scale with respect to one another.

DETAILED DESCRIPTION

The figures of the drawings show elements, features and components that are identical, have the same function and the same effect—unless stated otherwise—with the same reference numerals in each case.

Figure 1A:
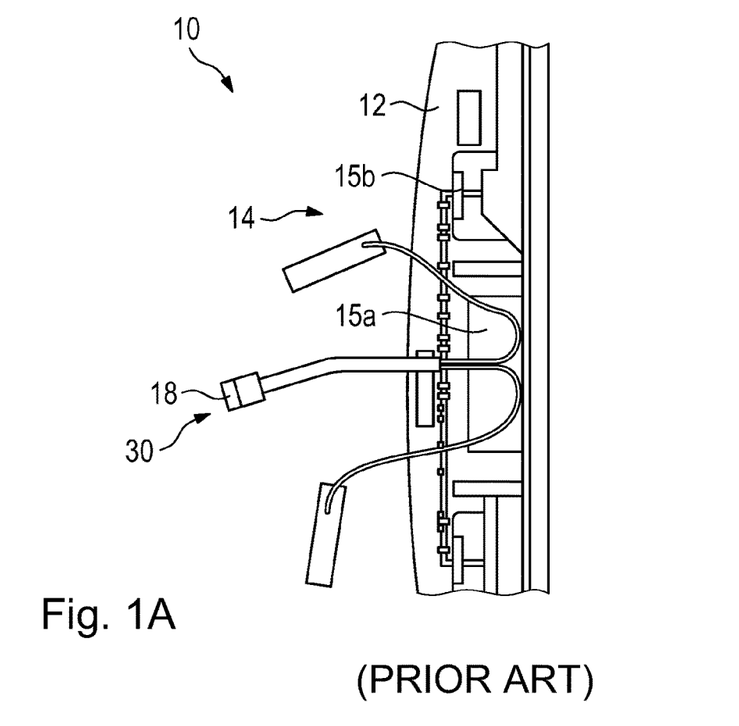
FIGS. 1A and 1B are planar top views of, respectively, a conventional and an inventive information panel as display device.
Figure 1B:
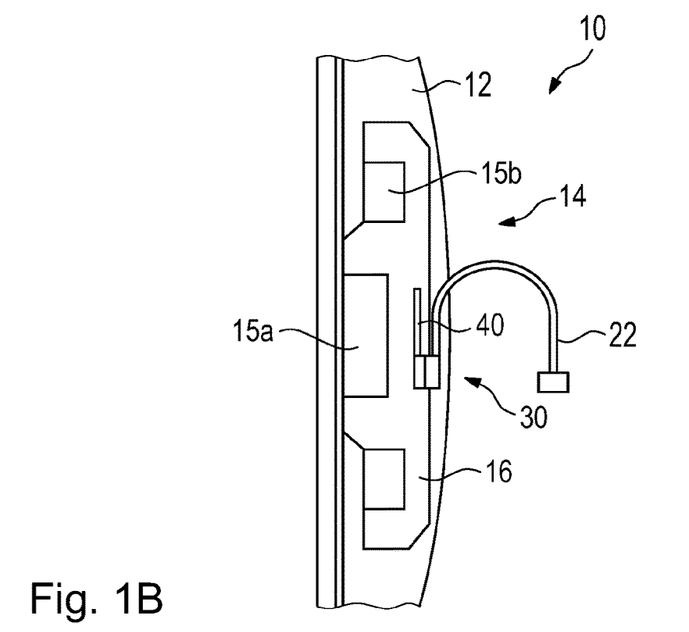

FIG. 1B shows a display device of the disclosure herein labeled 10 as a whole. In order to disclose the subject matter of the disclosure herein from conventional display devices, FIGS. 1A and 1B show two representations side by side, firstly of a conventional display device in current use (FIG. 1A) and, indeed, of the inventive display device 10 (FIG. 1B). The display devices 10 of FIGS. 1A and 1B should be disposed in an interior accommodated in an aircraft fuselage not shown in any detail here for guiding of occupants. The relevant display devices 10 are each provided with a carrier unit 12 disposed on a wall section of the interior (likewise not shown), and additionally has a display 14 that imparts at least one piece of visual information to the occupants of the interior when in operation, wherein the at least one display 14 is electrically operable or operated, and wherein the at least one display 14 is connectable or connected to a power supply 30 for operation thereof. The display 14 here has multiple display elements 15a, 15b, each of which impart different information to the occupants of the interior, with the information imparted depending both on the nature of the display element 15 and on the illumination state thereof.

In the present context, the display elements 15a, 15b are firstly backlit direction displays for exits, and secondly iconized information signs to toilet facilities, the illumination state of which indicates whether the facility in question is available or occupied. The display elements 15a, 15b mentioned are better discernible in FIGS. 2 and 3. The display device 10 of FIG. 1A, on its reverse side facing the observer, is clearly provided with a large number of circuits, terminals, clamps and equipment for illumination, which, being in no small number, have to be disposed on the carrier unit 12 within a considerable assembly time. Moreover, the power supply 30 for the display device 10 in FIG. 1A is indicated merely by a cable loom connection 18.

By contrast, in FIG. 1B, it is possible to see on the inventive display device ten that, firstly, the display 14 has been provided with an at least one-part layer 16 in the form of a flexible polymer film, on which layer 16 the circuits needed for operation of the display 14 have been provided in integrated form. The one-part layer 16 has been applied by its flexible polymer film to the reverse side of the display device 12, likewise facing the observer.

The power supply 30 is also formed here by a battery 40 that has been formed with a laminated composite structure and is connectable to the layer 16, and this, in the present case, is itself formed on and accommodated by the layer 16. In order to be able to establish a data connection, for instance, with further equipment in an aircraft, or in order to be able to charge the battery 40 disposed on the layer 16 permanently or at predetermined intervals, the layer 16 is connected by its terminal cable 22, by its connectors, to the on-board networks needed for the purpose.

Figure 2:
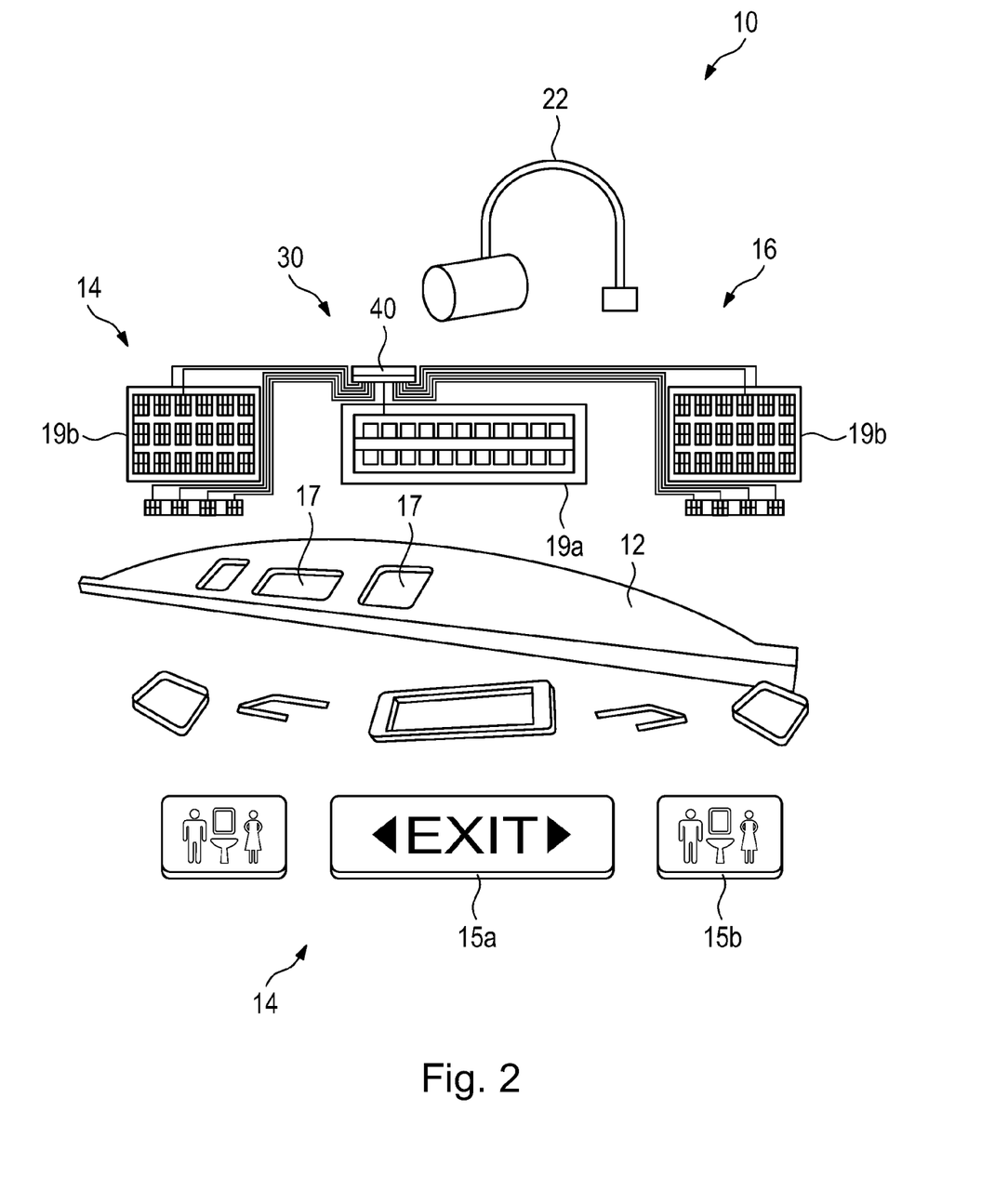
FIG. 2 is a partial perspective view of an exploded view of a display device of the disclosure herein with the display provided with layer and the composite structure battery.

FIG. 2 shows the inventive display device 10 in an exploded view, such that the individual elements can be identified in a simple manner by the observer. In the lower region of the figure, two display elements 15a, 15b of the display 14 are apparent, accommodated in their respective use position in appropriate recesses 17 of the carrier unit 12. Between the carrier unit 12 and the display elements 15a, 15b, further securing material is apparent for fixing of the display elements 15a, 15b on the carrier unit 12. Above the carrier unit 12 from the point of view of the observer of FIG. 2, it is apparent that the display 14 of the inventive display device 10 has been provided with the one-part layer 16 here, on which illuminants 19a, 19b are disposed in order to correspondingly backlight the display elements 15a, 15b if required, as is the power supply 30 with the battery 40 in layer form, in a kind of laminated composite battery structure.

It is apparent here that the battery 40, in the case of arrangement of the layer 16 on the carrier unit 12, is provided in a region between the two illuminants 19b above the somewhat flatter illuminant 19a in an eccentric position in the direction of the left-hand illuminant 19b from the observer's point of view. For suitable supply with energy, the power supply 30 is disposed at a point where the electrical connections of the respective illuminants 19a, 19b meet. It is apparent that the illuminants 19a, 19b mentioned are formed here by light-emitting diodes.

Moreover, FIG. 2 also shows a connection cable 22, by which the layer 16 can be connected to onboard networks of an aircraft (not shown in detail), in order to establish an electrical connection and/or a data connection.

Figure 3A:
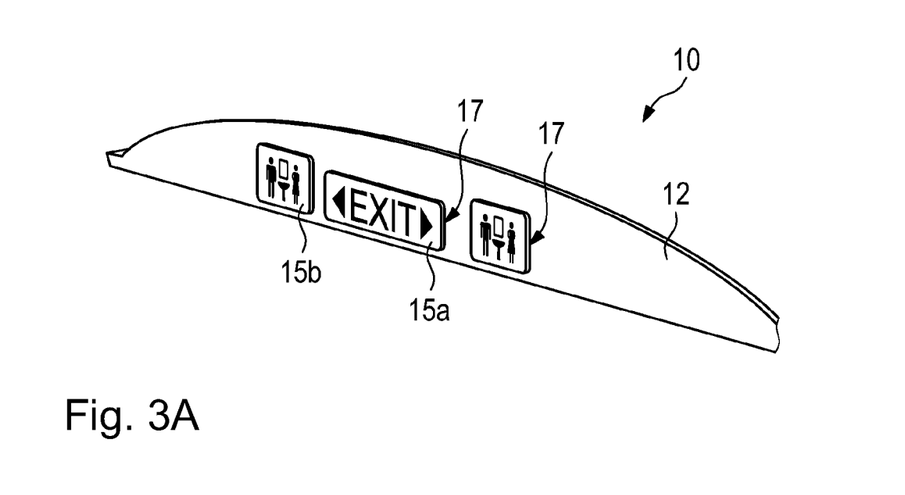
FIGS. 3A and 3B are perspective front views of a display device from FIG. 2 with carrier unit and display disposed thereon (FIG. 3A), and a reverse view of the same display device with battery visibly disposed thereon and formed thereon as a laminated structure composite (FIG. 3B)
Figure 3B:
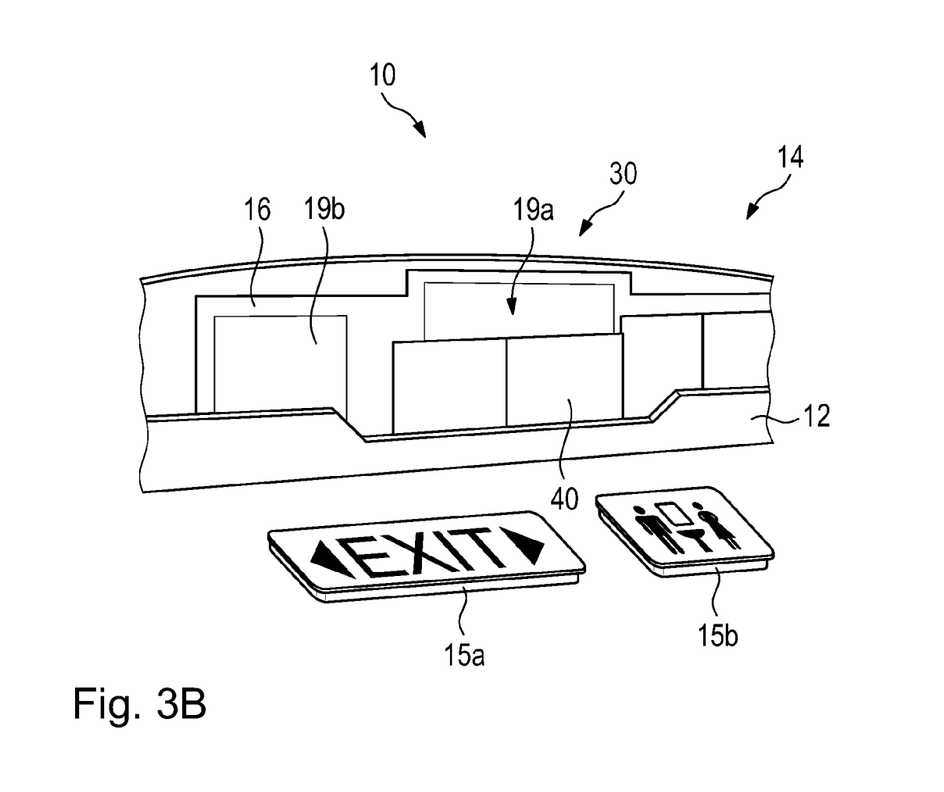

FIGS. 3A and 3B show the carrier unit 12 of the inventive display device 10 where FIG. 3A is a perspective view in which the respective display elements 15a, 15b are inserted into the corresponding recesses 17 of the carrier unit 12, and are therefore in their use position in this diagram. By contrast, FIG. 3B shows the carrier unit 12 of the display device 12 in a reverse view that reveals the view onto the layer 16 of the display 14. What this shows is, for instance, an illuminant 19b that forms part of a display element 15b and takes the form of part of the layer 16. Moreover, this view shows, facing the observer, the battery 40 which is formed on the layer 16 and has a laminated composite structure which, as already seen in FIG. 2, is disposed in the region of the illuminant 19a that forms part of the display element 15a.

It is additionally also apparent here that the composite structure battery 40 assigned to the inventive display device 10 has only a low space requirement with not inconsiderable energy storage, since the display elements shown, in the case of backlighting, have a supply requirement of the order of magnitude of a few tens of volts. The composite structure battery 40 is capable here, given a depth extending only to a few micrometers, of providing a voltage of a few volts, which allows the relevant space requirement to be limited. A power supply 30 here may interconnect and drive a multitude of composite structure batteries 40, since it is provided with a voltage controller 34 (not shown in detail) that may be integrated in turn as a component in the layer 16.

Figure 4:
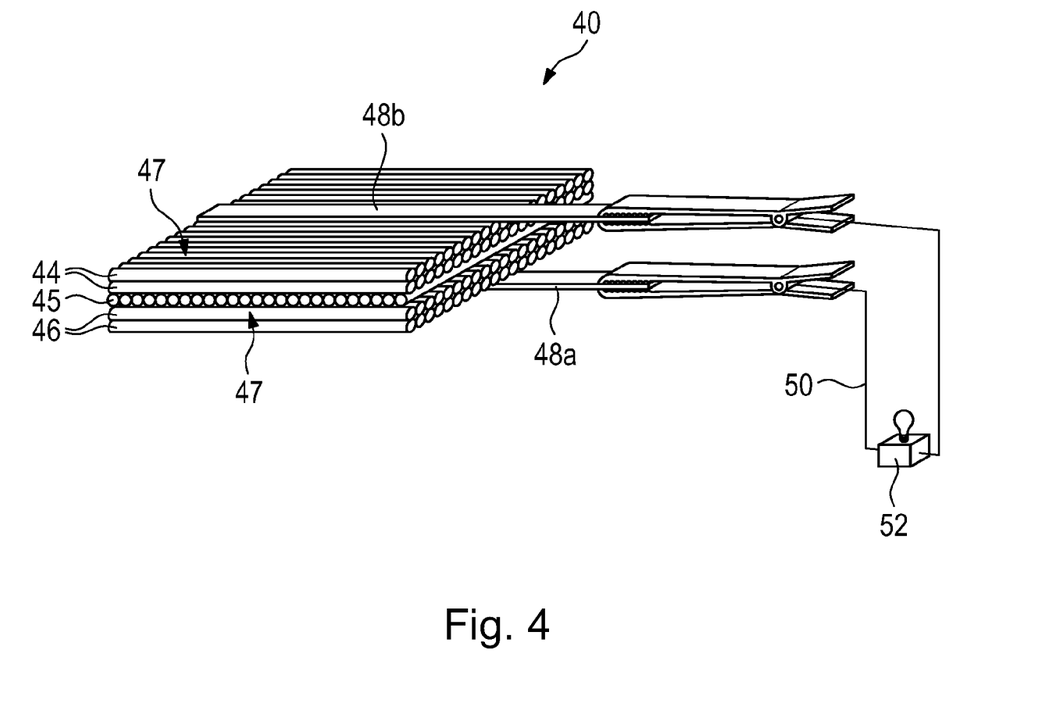
FIG. 4 is a diagram of the laminated composite structure battery with electrodes, separation layer and current collectors.

The battery cell 42, shown in FIG. 4, of a composite battery structure 40 serves to illustrate the layered construction of a battery 40 operated as power supply 30, or of the battery cells 42 thereof. The laminated composite structures thereof have been produced from layers of orthotropic materials, with each layer (lamella) of the laminated battery cell 42 having a separate function as electrode, current collector or separating layer (separator). The upper layer from the observer's point of view consists of reinforced carbon fibers embedded in an electrolyte 47 (SBE, solid battery electrolyte) and forms the negative electrode (cathode 44). The lower layer contains coated carbon fibers embedded in the electrolyte 47 and forms the positive electrode, the anode 46. Between the anode 46 and cathode 44, there is a separating layer 45 in the form of glass fibers as what is called a separator.

In addition, such battery cells 42 or the battery 40 must be connected to an external circuit via the current collectors 48a, 48b. These are closely linked and secured to the electrodes 44, 46, and conduct the energy from the electrodes to a consumer 52. In a lithium ion battery, the negative electrodes are accumulated at the anode, and the positive electrode at the cathode. During discharge, the positive ions flow through the electrolyte 47 to the anode 46, and the electrons flow from the anode 46 through the current collectors 48a, 48b through the external circuit 50 to the cathode 44. In the course of charging, the electrons flow back from the cathode 44 through the current collector 48b, through a charging unit (a device having higher potential, not shown) through the current collector 48a to the anode 46. Positive ions flow simultaneously through the electrolyte 47 to the cathode 44 until the charged state has been attained.

Accordingly, the disclosure herein thus relates more particularly to a display device 10 for guiding occupants within an interior accommodated by an aircraft fuselage, having a carrier unit 12 that is secured to a wall section of the interior and having at least one display 14 that imparts at least one piece of visual information to the occupants of the interior when in operation, wherein the at least one display 14 is electrically operable or operated, and wherein the at least one display 14 is connectable or connected to a power supply 30 for operation thereof. What is envisioned in accordance with the disclosure herein is that the at least one display 14 has been provided with an at least one-part layer 16 on which the circuits needed for operation thereof are provided in integrated form, and that the power supply 30 is formed by at least one composite structure battery 40 of layered structure which is connectable or connected to the layer 16.

By the inventive display device 10, it is possible, for instance, to provide an emergency exit system which, by virtue of the battery(s) 32, works even in the event of damage to or failure of the power supply by the generator. Such a system is highly flexible you enables adjustments even at the last minute, for instance in the event of specific customer requests. Moreover, the standardization that exists in aircraft enables automated installation. Moreover, weight, costs and lead times are reduced, compatibility with circuit board pathways and LEDs of conventional structures is good, and a reduction in weight and volume is additionally also achieved.

Even though the disclosure herein has been described above with reference to preferred working examples, it is not limited thereto, but is modifiable in various ways. More particularly, the disclosure herein can be altered or modified in manifold ways without departing from the core of the disclosure herein.

While at least one example embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE NUMERALS 10 display device
12 carrier unit
14 display
15a, 15b display element which on the layer formed
16 layer
18 cable loom connection
19a, 19b illuminant
22 connection cable
30 power supply
34 voltage controller
40 battery
42 battery cell
44 cathode, pole
45 separating layer (separator)
46 anode, pole
47 electrolyte
48a, 48b current collector
50 external circuit
52 consumer

The invention claimed is:

1. A display device for guiding occupants within an interior accommodated by an aircraft fuselage, comprising:
a carrier unit that is configured to be secured to a wall section of the interior;
at least one display disposed in the carrier unit, wherein the at least one display comprises:
an integrated circuit layer on which circuits needed for operation of the at least one display are in integrated form, wherein the integrated circuit layer is in one-part form;
multiple display elements that are each configured to impart different visual information to the occupants of the interior when in operation, wherein each of the multiple display elements comprises an illuminant disposed on the integrated circuit layer and connected to the circuits of the integrated circuit layer; and a power supply connected to the circuits of the integrated circuit layer in communication with each of the multiple display elements, wherein the power supply comprises:

at least one composite structure battery of layered structure which is formed on the integrated circuit layer, and a voltage controller disposed on the integrated circuit layer in communication with the at least one composite structure battery and the circuits of the integrated circuit layer, wherein the voltage controller is configured for selectively driving each illuminant of the multiple display elements; and an interface connected to the integrated circuit layer, the interface configured to establish a data connection to an on-board network in the aircraft fuselage for receiving signals to selectively and independently change an illumination state of each of the multiple display elements.

2. The display device of claim 1, wherein the integrated circuit layer takes a form of a flexible polymer film.

3. The display device of claim 1, wherein printed conductors, SMD components and/or further components are integrated into the integrated circuit layer.

4. The display device of claim 1, wherein the interface is connected to the power supply and is configured to establish an electrical connection to the on-board network.

5. The display device of claim 1, wherein the composite structure battery in layered structure has been formed with a laminated composite structure.

6. The display device of claim 1, wherein the composite structure battery comprises one battery cell or a multitude of battery cells, each of which has laminated layers with anode, separation layer and cathode.

7. The display device of claim 6, wherein the anode or anodes and the cathode or cathodes take a form of poles of a respective battery cell, each with carbon fibers having appropriate structure or a coating.

8. The display device of claim 6, wherein the separation layer is formed by a glass fiber laminate or a porous polyethylene.

9. The display device of claim 7, wherein the poles each have a solid-state electrolyte, formed by a polymer, for fiber connection of the carbon fibers.

10. The display device of claim 1, comprising current collectors each formed by a thermoplastic coated with a conductive material.

11. The display device of claim 10, wherein the thermoplastic is a polycarbonate in film form, provided with a silver layer in paste form by printing.

12. A method of producing a display device for guiding occupants within an interior accommodated by an aircraft fuselage, the method comprising:

securing a carrier unit to a wall section of the interior;
disposing at least one display in the carrier unit, the at least one display comprising:

an integrated circuit layer on which circuits needed for operation of the multiple display elements are in integrated form, wherein the integrated circuit layer is in one-part form; and multiple display elements that are each configured to impart different visual information to the occupants of the interior when in operation, wherein each of the multiple display elements comprises an illuminant disposed on the integrated circuit layer and connected to the circuits of the integrated circuit layer;

connecting the at least one display to an on-board network in the aircraft fuselage with an interface configured to establish a data connection for receiving signals to selectively and independently change an illumination state of each of the multiple display elements;

forming a power supply by laminating at least one anode layer having carbon fibers, at least one cathode layer having coated carbon fibers, and at least one separation layer comprising glass fibers or a porous polyethylene;

disposing the power supply on the at integrated circuit layer in the carrier unit; and connecting the at least one display to the power supply, wherein the power supply is usable either as battery or as load carrier for the at least one display.

13. The method of claim 12, further comprising at least one of:

combining and connecting a multitude of battery cells to form a battery;

providing ends of a battery cell or battery with current collectors comprising a coated thermoplastic;

loading the battery cell or battery and testing battery function.

14. An aircraft comprising the display device of claim 1.

15. The display device of claim 1, wherein the at least one display and the power supply are disposed in a layered arrangement on the integrated circuit layer.

16. The method of claim 12, wherein disposing the power supply in the carrier unit comprises disposing the at least one display and the power supply in a layered arrangement on the integrated circuit layer.

17. The method of claim 12, comprising connecting the power supply to the interface to establish an electrical connection with the on-board network in the aircraft fuselage.

18. The display device of claim 1, wherein the multiple display elements comprise a backlit direction displays for exits and iconized information signs to toilet facilities.

19. The method of claim 12, wherein the multiple display elements comprise a backlit direction displays for exits and iconized information signs to toilet facilities.

* * * * *